(12) United States Patent
Gilabert

(10) Patent No.: US 9,163,860 B2
(45) Date of Patent: Oct. 20, 2015

(54) PRESTRESSED SOLAR COLLECTOR MODULE

(75) Inventor: Felix Muñoz Gilabert, Sevilla (ES)

(73) Assignee: Abengoa Solar New Technologies, S.A., Sevilla (ES)

( * ) Notice: Subject to any disclaimer, the term of this patent is extended or adjusted under 35 U.S.C. 154(b) by 18 days.

(21) Appl. No.: 13/638,554

(22) PCT Filed: Mar. 31, 2011

(86) PCT No.: PCT/ES2011/000098
§ 371 (c)(1),
(2), (4) Date: May 15, 2013

(87) PCT Pub. No.: WO2011/121153
PCT Pub. Date: Oct. 6, 2011

(65) Prior Publication Data
US 2013/0220950 A1 Aug. 29, 2013

(30) Foreign Application Priority Data

Mar. 31, 2010 (ES) .................... P201000426

(51) Int. Cl.
*A47F 7/00* (2006.01)
*F24J 2/52* (2006.01)
*F24J 2/14* (2006.01)

(52) U.S. Cl.
CPC .. *F24J 2/523* (2013.01); *F24J 2/14* (2013.01); *Y02E 10/45* (2013.01)

(58) Field of Classification Search
CPC ............. F24J 2/523; F24J 2/14; F24J 2/5235; F24J 2/5211
USPC ............. 126/694, 696, 692; 52/173.3, 223.8, 52/223.9, 639, 848, 849, 843, 836, 844, 52/845; 359/867, 853
See application file for complete search history.

(56) References Cited

U.S. PATENT DOCUMENTS

| 4,135,493 A | 1/1979 | Kennedy |
| 4,386,600 A * | 6/1983 | Eggert, Jr. .................... 359/852 |

(Continued)

FOREIGN PATENT DOCUMENTS

| CA | 1088828 | 11/1980 |
| DE | 197 44767 | 4/2009 |

(Continued)

OTHER PUBLICATIONS

ISR for related PCT/ES2011/000098 mailed on Mar. 8, 2011, and its English translation.

(Continued)

*Primary Examiner* — Korie H Chan
(74) *Attorney, Agent, or Firm* — Kilpatrick Townsend & Stockton LLP

(57) ABSTRACT

The invention relates to a prestressed solar collector module forming a support structure for solar collectors, of the type formed by a lattice bar structure including a central beam (1) essentially characterized in that:
  the central beam or torque box (1) takes the form of a multi-face polyhedron or cylinder, that is divided into sections (3) each section (3) being formed by multiple bent or curved plates (4),
  a surrounding triangular lattice structure (16) is provided to support the parabolic reflector (17) which structure is formed with L-shaped elements, all of the connections being formed with rivets,
  and all of the structure is prestressed using a series of tension rods (13, 14, 15) which optimize the flexural behavior of the structure and which include end anchoring points and intermediate through-points allowing the necessary curvature to be obtained and the tension to be maintained.

17 Claims, 5 Drawing Sheets

(56) References Cited

U.S. PATENT DOCUMENTS

| | | | |
|---|---|---|---|
| 5,069,540 | A | 12/1991 | Gonder |
| 6,389,766 | B1 * | 5/2002 | Jackson ........................ 52/291 |
| 6,414,237 | B1 | 7/2002 | Boer |
| 7,047,704 | B1 * | 5/2006 | Han ........................ 52/745.19 |
| 7,305,802 | B1 * | 12/2007 | Plavidal ........................ 52/291 |
| 7,464,512 | B1 * | 12/2008 | Perina ........................ 52/651.01 |
| D649,930 | S * | 12/2011 | Lindor ........................ D13/102 |
| 8,256,413 | B2 * | 9/2012 | Koetter et al. ................ 126/600 |
| 2004/0118395 | A1 | 6/2004 | Rubbia et al. |
| 2010/0208375 | A1 * | 8/2010 | Albisu Tristan et al. ..... 359/867 |
| 2010/0252030 | A1 * | 10/2010 | Marcotte et al. .............. 126/694 |
| 2011/0283652 | A1 * | 11/2011 | Haridasu et al. ........... 52/651.01 |

FOREIGN PATENT DOCUMENTS

| | | |
|---|---|---|
| EP | 0082068 | 6/1983 |
| ES | 2161589 | 12/2001 |
| ES | 2274710 | 5/2007 |
| ES | 2326303 | 10/2009 |
| ES | 1070880 U | 11/2009 |

OTHER PUBLICATIONS

Chapter I PCT IPRP with Written Opinion issued on Oct. 2, 2012 from corresponding PCT application, Application No. PCT/ES2011/000098, and it English translation.

* cited by examiner

PRESTRESSED SOLAR COLLECTOR MODULE

CROSS-REFERENCE TO RELATED APPLICATIONS

This application is the U.S. National Stage of International Patent Application No. PCT/ES2011/000098 filed on Mar. 31, 2011, which claims priority to Spanish Patent Application No. P201000426 filed on Mar. 31, 2010, the disclosures of which are hereby incorporated by reference in their entireties.

TECHNICAL FIELD OF THE INVENTION

The present invention falls within the collectors' field, more specifically it relates to the structures that are used for the attachment of the mirrors and the receptors responsible for concentrating solar radiation.

BACKGROUND OF THE INVENTION

In the plants for production of electricity from solar radiation, solar collectors of various types (cylinder parabolic collector, Stirling dish, central tower with heliostats, Fresnel collectors, etc.) can be used and all of them require support structures for the mirrors responsible for concentrating solar radiation.

Generally, said structures have in addition a device called a solar tracker that allows them to be oriented towards the sun, which leads them to obtaining high yields.

The invention claimed herein refers to the support structure of the solar collector module, not being an object of the invention the solar tracker that can be attached later.

There is a vast amount of state of the art relating to the support structures of solar collectors modules, such as the U.S. Pat. No. 6,414,237, U.S. Pat. No. 5,069,540, ES2326303, ES2161589, CA1088828, EP0082068, U1070880 and many others.

Many of the inventions of the state of the art describe lattice structures that support collectors of cylinder parabolic type. The cylinder parabolic collectors for collecting solar energy use cylinder parabolic-shaped mirrors. A pipe or collector tube that receives the concentrated rays of the sun passes through the focus of the parabola, where the fluid is heated. Once the fluid is heated, which reaches temperatures close to 400° C., if said fluid is steam it is sent to a turbine to produce electricity or, if we have another type of heat transfer fluids that are not in vapour phase at said temperature, then they are sent to a heat exchanger for the production of this.

The structures that support these collectors consist of a series of beams, arms and the connections between them, the beams being those elements that support the central structure or torque box, and these are beams subjected to great torques and bending stresses and, usually very long, which causes problems because of the arrow that this produces and it also greatly complicates its transport to the plant.

In view of the state of the art, the invention claimed herein is intended to provide a structure that serves as a support for a solar collector module of cylinder parabolic type and that even despite being formed by a reticular structure of knots and bars, has a series of characteristics that make it substantially different from those known in the state of the art, providing significant advantages both of structural strength and cost reduction in the transport and assembly.

DESCRIPTION OF THE INVENTION

The invention consists of a support structure for a cylinder-parabolic solar collector module.

The main components of the solar field of the cylinder-parabolic technology are:

The cylinder-parabolic reflector: the mission of the cylinder-parabolic reflector is to reflect and concentrate on the absorber tube the direct solar radiation that strikes the surface. The specular surface is achieved through silver or aluminium films deposited on a support that provides it with the sufficient rigidity.

The absorber tube: it consists of two concentric tubes separated by a vacuum layer. The inner one, through which the fluid that is heated flows is made of metal and the outer one is made of glass.

The sun tracking system: the most common tracking system consists of a device that rotates the cylinder parabolic reflectors of the collector around an axis.

The metal structure: the mission of the structure of the collector is to provide rigidity to the set of elements that compose it.

The claimed invention is focused on developing a structure that, unlike the known state of the art, has a number of essential features that provide it with significant advantages over those existing in the field.

The essential features are:

1.—Multi-face and sectioned polyhedron or cylindrical central structure: The central part or beam of the structure, also called torque box, is the part that is responsible for supporting the torques caused by the weight of the absorber tube and the wind stresses. In addition, the arms are supported and the legs of the structure are attached on it. One of the main features that are included is that this central part of the structure or torque box is the change of its geometry with respect to the state of the art since it progresses from having triangular or rectangular section to being multilayer cylindrical or polyhedron. At its ends, covers will act as anchoring point of the absorber tube located high above. In addition, this torque box consists of a number of sectors of the same length and each one of the sectors is formed in turn by several curved or folded thin plates, such that these plates are transported stacked, greatly facilitating the logistics and achieving an ideal transport system. Once in the plant, each of the sections are mounted starting from the plates and then the whole torque box is mounted, connecting the different sectors with pieces called diaphragms that materialize the connection and prevent any local dents in the cylinder due to the point loads exerted by the supports of the absorber tubes.

2.—Triangular lattice structure: surrounding structure to support the parabolic reflector, which structure is formed with L-shaped elements, all of the connections being formed with rivets or equivalent.

3.—Tightened structure: all of the structure is prestressed using at least one tension rod which optimises the flexural behaviour of the structure, in this way having the torque box supported only on two points is prevented. This problem could have been solved by increasing the thickness of the tube, but also the price and the weight would have been increased. The tension rods work to oppose the arrow, it is attempted to produce the same in any of the positions or orientations that the torque box takes and depending on said positions, one or the other tension rods will work, but they will always work to oppose the deformation. The tension rods have end anchoring points thanks to which providing them with the required prestress is achieved and intermediate through-points allowing the necessary curvature to be obtained and the tension to be maintained.

These three essential features of the new structure efficiently and cost effectively solve the existing problems so far concerning the torques, bending stresses, transport and assembly of the structure.

DESCRIPTION OF THE DRAWINGS

To complete the description that is being carried out and to help to a better understanding of the invention, a set of drawings is accompanied where with illustrative character and without limitation, the following has been represented.

PREFERRED EMBODIMENT OF THE INVENTION

To achieve a greater understanding of the invention the solar collector module according to a preferred embodiment will be described above.

Figure 1:
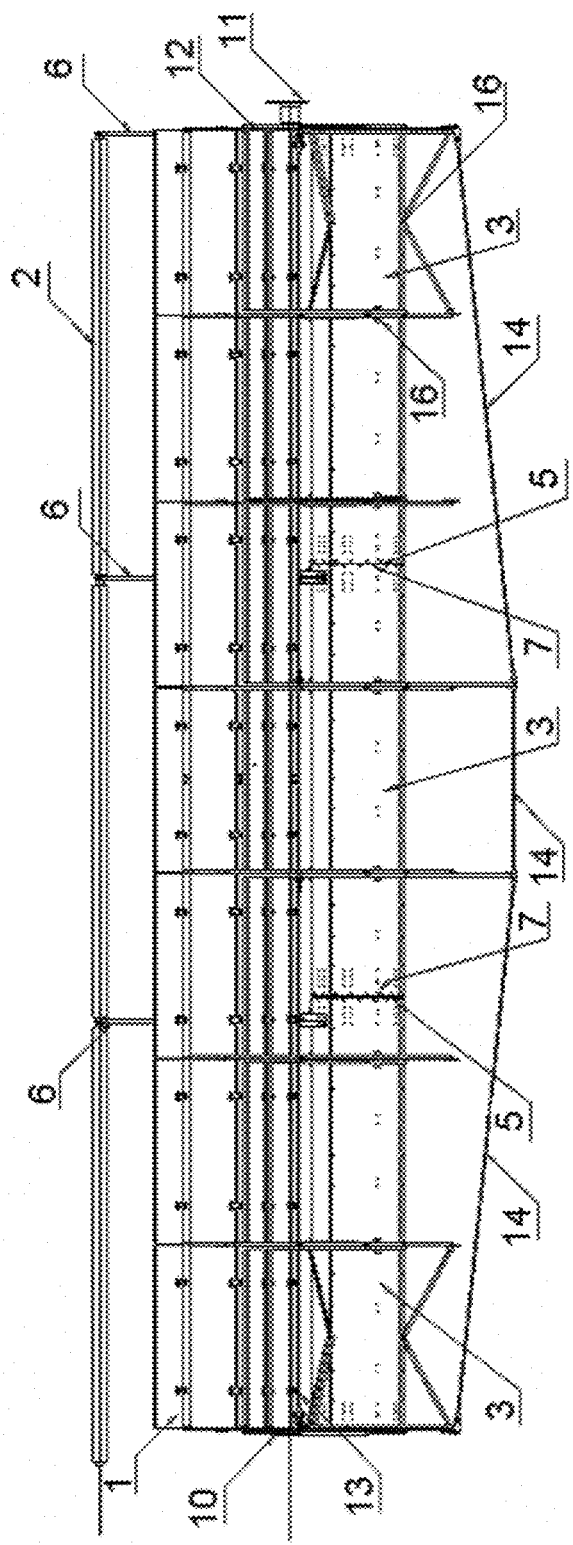
FIG. 1: Elevation of the module
Figure 2:
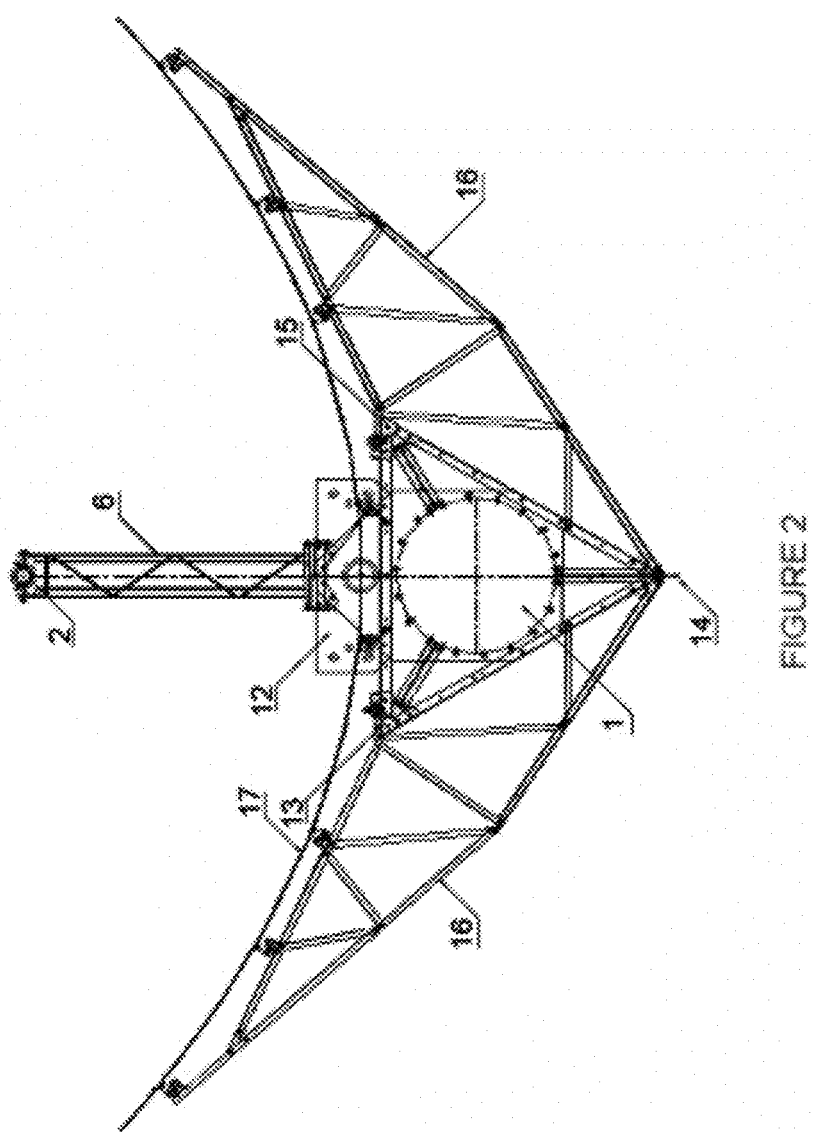
FIG. 2: Side view of the module
Figure 3:
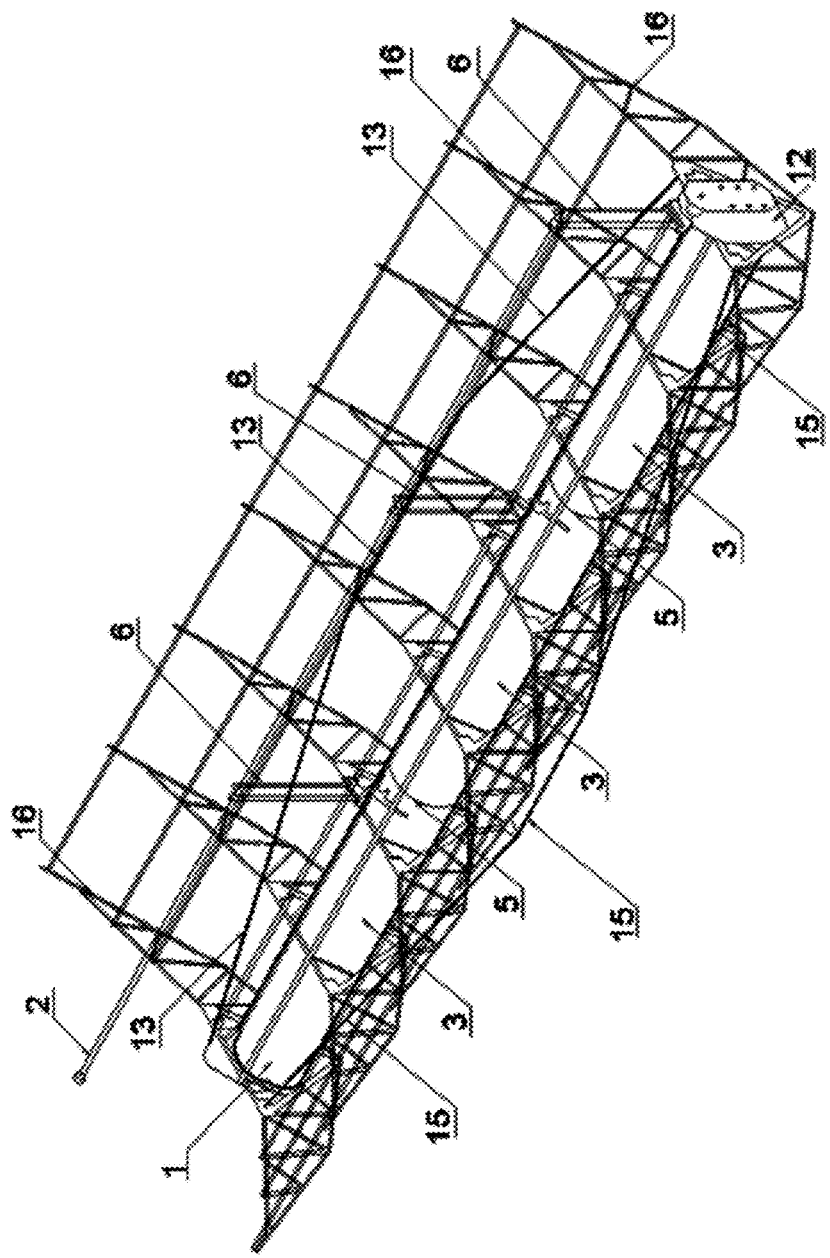
FIG. 3: Perspective view of the module
Figure 5:
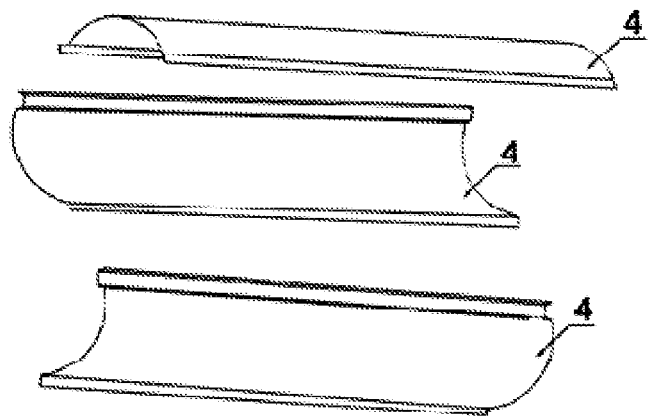
FIG. 5: Folded plates that make up each tube

In FIGS. 1-3 is shown a preferred embodiment of the module wherein the torque box or central part of the structure (1) has a total length of 12 meters. The torque box (1) is divided into three sections (3) of 4 m each. Each of the sections is formed by three folded or curved plates (4) that, when mounted, make up the polyhedron or cylindrical tube, such as it is shown in FIG. 5 (in FIG. 5 they appear as curved plates, but they may also be made based on folds). Pieces called diaphragms (5) are used to connect the sections (3) and form the entire tube (1); these diaphragms (5) prevent any local dents in the cylinder (1) due to the point loads exerted by the supports (6) of the absorber tubes (2).

Figure 6A:
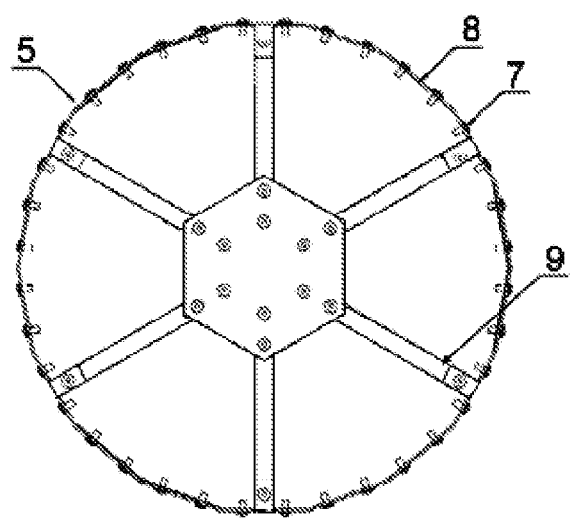
FIG. 6A: Connection diaphragm
Figure 6B:
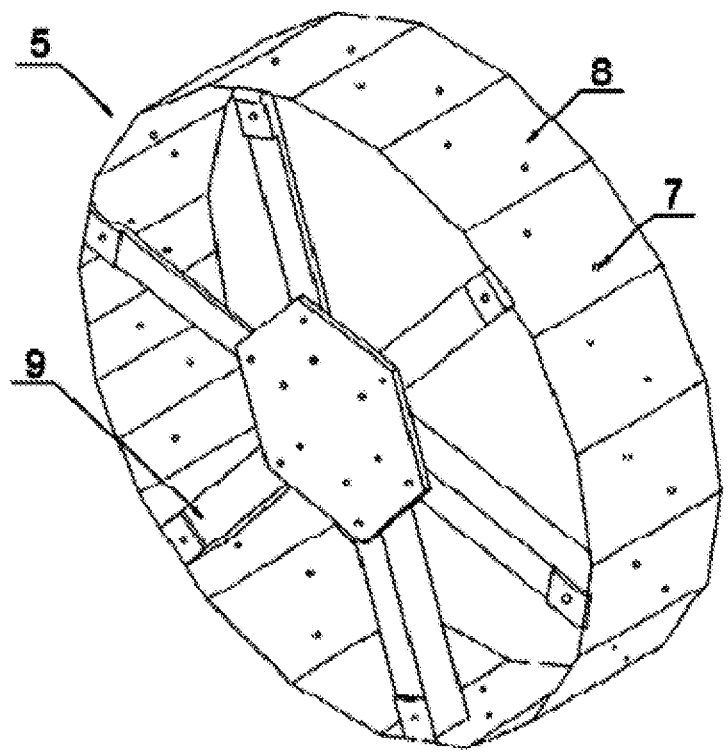
FIG. 6B: Perspective view of the connection diaphragm

These diaphragms (5) are shown in FIGS. 6A and 6B. Thanks to them it is possible to materialize the connection between the different sections (3), increasing the rigidity of the set and decreasing the torques.

The diaphragms (5) are connected to the plates (4) which form the sections (3) of the torque box (1) through riveting (7). They consist of a hexagon or cylindrical plate (8) (depending on the geometry of the torque box (1)), the folds or curvature of which coincide with that of the plates (4) of the sections (3) of the torque box (1) and a series of spokes (9) which rigidize the set. Two diaphragms (5) are placed for every 12 m.

The torque box (1) also serves as fastening for the legs that support the structure on the ground.

As shown in FIGS. 1-3, two covers (10, 12) are placed on the ends of the torque box (1). The rotation axis of the collector (11) and a support (6) for the absorber tube (2) are located on one of the covers (12), the other cover (10) is intended to connect this module with its adjacent. Along the length of the torque box two additional supports (6) are attached for the absorber tube (2) (FIG. 3).

Figure 4:
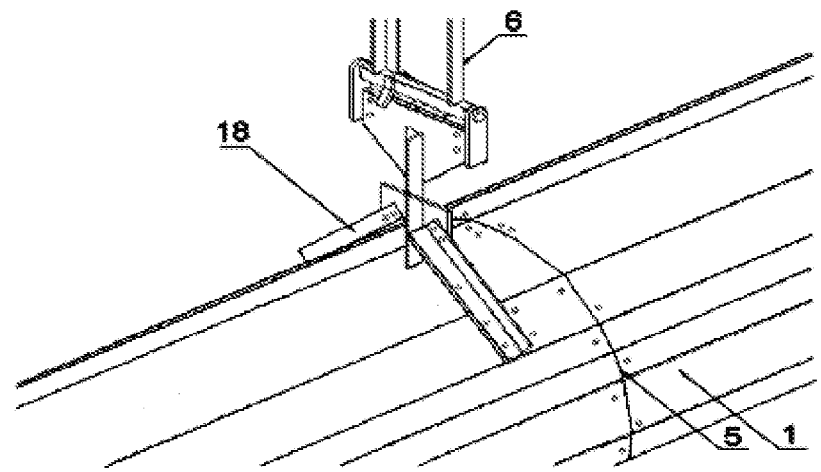
FIG. 4: Connection detail of the collector tube

The fact that the geometry of the torque box (1) has changed and now it is a polyhedron (or cylinder) allows to greatly simplify the connection element between the absorber tube (2) and the cylinder (1) since, as shown in FIG. 4, the pyramid-shaped element (18) can be directly supported on the cylinder (1) while with the triangular or square geometry of the above developments, it is necessary to introduce an element of transition between both of them to adapt both geometries, making the assembly difficult and more expensive.

The module, in addition to the torque box (1) comprises a triangular lattice structure (16), shown in FIGS. 2 and 3, consisting of a surrounding structure to support the parabolic reflector (17), which is made of L-shaped elements, all the connections being formed with rivets or equivalent methods of connection.

Another essential feature of the module is that it is a tightened structure. As shown in FIGS. 1 to 3, in the case of the preferred embodiment, the set of the structure is prestressed by using three tension rods, a tension rod so-called vertical (14) that runs through the structure by its centre from one end to another and two tension rods so-called horizontal (13, 15) which are placed one on each side of the torque box (1). These three tension rods optimise the flexural behaviour and solve the problem of the arrow occurring due to the torque box (1) being supported only on two end points.

Thus, the tension rods work to oppose the arrow, which attempts to occur in any of the positions adopted by the torque box (1). It happens that in zenithal position only the vertical tension rod (14) will work, when the collector is located at 90° only the horizontal tension rod (13 or 15, depending on the direction of the rotation) will work and the other two (14 and 15 or 14 and 13, as appropriate) will not withstand any load, in other intermediate positions the vertical tension rod (14) and one of the two horizontal tension rods (13 or 15, depending on the orientation direction) will work, but they will always work to oppose the deformation.

Figure 7:
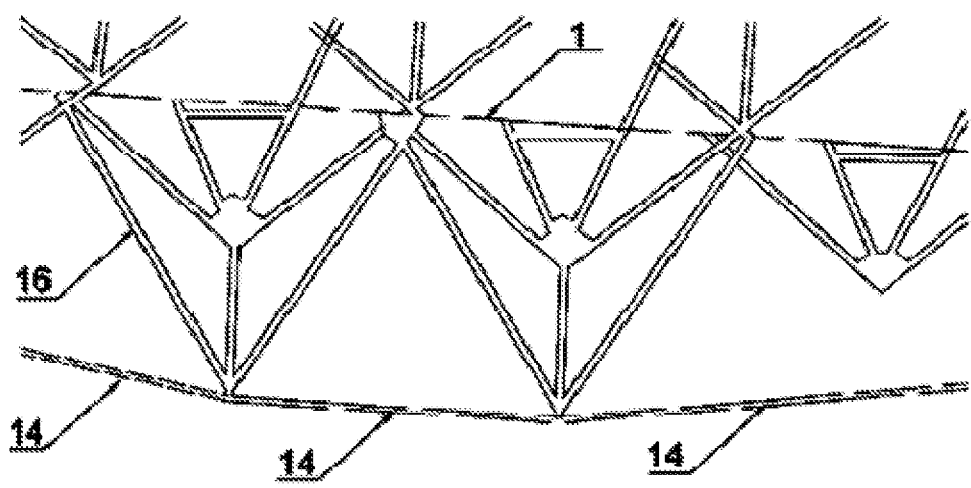
FIG. 7: Detail of the vertical tension rod The references of the figures represent:
1. Central beam or Torque box
2. Absorber tube
3. Section of the torque box
4. Curved plates
5. Diaphragm
6. Absorber tube support
7. Riveting
8. Hexagon plate
9. Spokes of the diaphragm
10. Cover of the torque box that connects one module with the contiguous one
11. Axis of rotation of the collector
12. Cover of the torque box with support for the absorber tube
13. Horizontal tension rod
14. Vertical tension rod
15. Horizontal tension rod
16. Triangular lattice structure
17. Parabolic reflector
18. Pyramid support

The tension rods have end anchoring points thanks to which providing them with the required prestress is achieved and intermediate through-points allowing the necessary curvature to be obtained and the tension to be maintained. FIG. 7 shows a detailed scheme of the vertical tension rod (14).

The structure or collector module described is specifically designed for its application in cylinder parabolic collectors, but its extension to other fields of the industry that require similar features is not excluded.

The invention claimed is:

1. A solar collector module forming a support structure for solar collectors, of the type formed by a lattice bar structure including a central beam, the solar collector module comprising:

a central beam or torque box with multi-face polyhedron or cylinder geometry, assembled from several longitudinal sections and each longitudinal section being formed by several plates;

a surrounding triangular lattice structure to support a parabolic reflector;
wherein the module is prestressed by using a plurality of tension rods increasing the stiffness of the said module;
and wherein the tension rods have anchoring points located at the ends of the tension rods, which provide the tension rods with the required prestress;
and wherein the tension rods have intermediate points located between the anchoring points, and the intermediate points interact with the triangular lattice structure to maintain a curvature of the tension rods and the tension;
and wherein at least one tension rod is located on one side of the torque box.

2. The solar collector module according to claim 1 wherein the plates forming the sections of the central beam or torque box are curved or folded.

3. The solar collector module according to claim 2 wherein the different sections of the central beam or torque box are joined together by section connectors which comprise a folded or cylindrical plate.

4. The solar collector module according to claim 3 wherein the folds or the curvature of the section connectors match the folds or the curvature of the plates of the sections of the torque box.

5. A solar collector module forming a support structure for solar collectors, of the type formed by a lattice bar structure including a central beam, the solar collector module comprising:
a central beam or torque box with multi-face polyhedron or cylinder geometry, assembled from several sections and each section being formed by several plates;
a surrounding triangular lattice structure to support a parabolic reflector;
wherein the plates forming the sections of the central beam or torque box are curved or folded;
and wherein the different sections of the central beam or torque box are joined together by section connectors which comprise a folded or cylindrical plate;
and wherein the section connectors have a series of spokes which rigidize the set.

6. The solar collector module according to claim 1 wherein two covers are placed on the ends of the torque box.

7. The solar collector module according to claim 6 wherein on one cover is located the rotation axis of the collector.

8. The solar collector module according to claim 6 wherein on one cover is located a support for an absorber tube.

9. The solar collector module according to claim 6 wherein a cover is configured to connect said solar collector module with an adjacent solar collector module.

10. The solar collector module according to claim 1 wherein a series of supports of an absorber tube are attached on the torque box.

11. The solar collector module according to claim 10 wherein the supports for the absorber tube are pyramid-shaped.

12. The solar collector module according to claim 11 wherein the supports for the absorber tube are directly supported on the torque box without the need for using any additional element.

13. The solar collector module according to claim 1 wherein the anchoring points are located at the ends of the tension rods.

14. The solar collector module according to claim 1 wherein the intermediate points are at through-points of the triangular lattice structure.

15. The solar collector module according to claim 1 wherein at least one tension rod runs through a central portion of the module from a first end of the module to a second end of the module.

16. A solar collector module forming a support structure for solar collectors, of the type formed by a lattice bar structure including a central beam, the solar collector module comprising:
a central beam or torque box with multi-face polyhedron or cylinder geometry, assembled from several longitudinal sections and each longitudinal section being formed by several plates;
a surrounding triangular lattice structure to support a parabolic reflector;
wherein the module is prestressed by using a plurality of tension rods increasing the stiffness of the said module;
and wherein the tension rods have anchoring points located at the ends of the tension rods, which provide the tension rods with the required prestress;
and wherein the tension rods have intermediate points located between the anchoring points, and the intermediate points interact with the triangular lattice structure to maintain a curvature of the tension rods and the tension;
and wherein the solar collector module comprises three tension rods.

17. The solar collector module according to claim 16 wherein a vertical tension rod runs through a central portion of the module from a first end of the module to a second end of the module and two horizontal tension rods which are placed one on each side of the torque box such that in zenithal position only the vertical tension rod will work, at 90° only one horizontal tension rod will work and in other intermediate positions the vertical tension rod and one of the two horizontal tension rods will work.

* * * * *